United States Patent
Guatta

(10) Patent No.: US 10,820,382 B2
(45) Date of Patent: Oct. 27, 2020

(54) METHOD AND APPARATUS FOR DELIVERING RADIO FREQUENCY ELECTROMAGNETIC ENERGY TO COOK FOODSTUFF

(71) Applicants: WHIRLPOOL CORPORATION, Benton Harbor, MI (US); Panasonic Corporation, Kadoma-Shi (JP)

(72) Inventor: Davide Guatta, Brescia (IT)

(73) Assignees: Whirlpool Corporation, Benton Harbor, MI (US); Panasonic Corporation, Osaka (JP)

(*) Notice: Subject to any disclaimer, the term of this patent is extended or adjusted under 35 U.S.C. 154(b) by 237 days.

(21) Appl. No.: 16/072,690

(22) PCT Filed: Jan. 28, 2016

(86) PCT No.: PCT/US2016/015363
§ 371 (c)(1),
(2) Date: Jul. 25, 2018

(87) PCT Pub. No.: WO2017/131698
PCT Pub. Date: Aug. 3, 2017

(65) Prior Publication Data
US 2019/0045589 A1    Feb. 7, 2019

(51) Int. Cl.
*H05B 6/64* (2006.01)
*H05B 6/68* (2006.01)
*H02M 7/5387* (2007.01)

(52) U.S. Cl.
CPC ............. *H05B 6/687* (2013.01); *H05B 6/686* (2013.01); *Y02B 40/143* (2013.01)

(58) Field of Classification Search
CPC ....... H05B 6/687; H05B 6/686; Y02B 40/143
USPC ....... 219/721, 722, 723, 724, 492, 704, 719, 219/715, 716, 739; 345/173; 426/243; 323/283; 363/98, 17, 21, 97
See application file for complete search history.

(56) References Cited

U.S. PATENT DOCUMENTS

| | | | |
|---|---|---|---|
| 2,742,612 A | 4/1956 | Cohn | |
| 2,956,143 A | 10/1960 | Schall | |
| 2,958,754 A | 11/1960 | Hahn | |
| 2,981,904 A | 4/1961 | Ajioka et al. | |
| 3,260,832 A | 7/1966 | Johnson | |
| 3,265,995 A | 8/1966 | Hamasaki | |
| 3,430,023 A | 2/1969 | Tingley | |
| 3,440,385 A | 4/1969 | Smith | |
| 3,489,135 A | 1/1970 | Astrella | |

(Continued)

FOREIGN PATENT DOCUMENTS

| CN | 1523293 A | 8/2004 |
|---|---|---|
| CN | 2935699 Y | 8/2007 |

(Continued)

*Primary Examiner* — Quang T Van
(74) *Attorney, Agent, or Firm* — Price Heneveld LLP

(57) ABSTRACT

A method and apparatus for delivering radio frequency electromagnetic energy to cook foodstuff in an enclosed cavity of a cooking device includes generating, with a small signal generating component, a radio frequency signal at a first power level, amplifying the radio frequency signal to a second power level greater than the first power level with a radio frequency amplification component, and feeding the amplified radio frequency signal to the enclosed cavity.

14 Claims, 4 Drawing Sheets

(56) References Cited

U.S. PATENT DOCUMENTS

| | | |
|---|---|---|
| 3,536,129 A | 10/1970 | White |
| 3,639,717 A | 2/1972 | Mochizuki |
| 3,731,035 A | 5/1973 | Jarvis et al. |
| 3,737,812 A | 6/1973 | Gaudio et al. |
| 3,812,316 A | 5/1974 | Milburn |
| 4,000,390 A | 12/1976 | Graff |
| 4,088,861 A | 5/1978 | Zwillinger |
| D248,607 S | 7/1978 | Yamamura et al. |
| 4,101,750 A | 7/1978 | Doner |
| 4,107,502 A | 8/1978 | Tanaka et al. |
| 4,136,271 A | 1/1979 | Tanaka et al. |
| 4,139,828 A | 2/1979 | Commault et al. |
| 4,143,646 A | 3/1979 | Sampsel et al. |
| 4,166,207 A | 8/1979 | Burke |
| 4,196,332 A | 1/1980 | MacKay et al. |
| 4,264,800 A | 4/1981 | Jahnke et al. |
| 4,283,614 A | 8/1981 | Tanaka et al. |
| 4,321,445 A | 3/1982 | Kristof et al. |
| 4,354,562 A | 10/1982 | Newman |
| 4,374,319 A | 2/1983 | Guibert |
| D268,079 S | 3/1983 | Miyake et al. |
| 4,463,324 A | 7/1984 | Rolfs |
| D275,546 S | 9/1984 | Tanaka et al. |
| D276,122 S | 10/1984 | Tanaka et al. |
| D277,355 S | 1/1985 | Miyake et al. |
| 4,595,827 A | 6/1986 | Hirai et al. |
| D285,893 S | 9/1986 | Mizuma et al. |
| 4,628,351 A | 12/1986 | Heo |
| 4,673,800 A | 6/1987 | Hirai et al. |
| 4,703,151 A | 10/1987 | Sakamoto |
| 4,743,728 A | 5/1988 | Nagafusa et al. |
| D297,698 S | 9/1988 | Nishikawa et al. |
| D297,800 S | 9/1988 | Feil et al. |
| 4,786,774 A | 11/1988 | Kaminaka |
| D303,063 S | 8/1989 | Satake |
| 4,870,238 A | 9/1989 | Hodgetts et al. |
| 4,886,046 A | 12/1989 | Welch et al. |
| 4,937,413 A | 6/1990 | Spruytenburg et al. |
| 4,999,459 A | 3/1991 | Smith et al. |
| 5,075,525 A | 12/1991 | Jung |
| D330,144 S | 10/1992 | Takebata et al. |
| 5,369,254 A | 11/1994 | Kwon |
| D353,511 S | 12/1994 | Saimen |
| 5,483,045 A | 1/1996 | Gerling |
| 5,546,927 A | 8/1996 | Lancelot |
| 5,558,800 A | 9/1996 | Page |
| D378,723 S | 4/1997 | Weiss |
| 5,619,983 A | 4/1997 | Smith |
| D385,155 S | 10/1997 | Weiss et al. |
| 5,735,261 A | 4/1998 | Kieslinger |
| 5,831,253 A | 11/1998 | Han et al. |
| 5,878,910 A | 3/1999 | Gibernau et al. |
| D411,074 S | 6/1999 | Sakai et al. |
| 5,919,389 A | 7/1999 | Uehashi et al. |
| 5,928,540 A | 7/1999 | Antoine et al. |
| 5,973,305 A | 10/1999 | Kim et al. |
| 5,981,929 A | 11/1999 | Maeda et al. |
| 6,018,158 A | 1/2000 | Kang |
| 6,054,696 A | 4/2000 | Lewis et al. |
| 6,057,535 A | 5/2000 | Derobert et al. |
| 6,097,019 A | 8/2000 | Lewis et al. |
| 6,268,593 B1 | 7/2001 | Sakai |
| 6,359,270 B1 | 3/2002 | Bridson |
| 6,429,370 B1 | 8/2002 | Norte et al. |
| 6,433,321 B1 * | 8/2002 | Lee .............. H05B 6/6423 219/715 |
| 6,557,756 B1 | 5/2003 | Smith |
| 6,559,882 B1 | 5/2003 | Kerchner |
| D481,582 S | 11/2003 | Seum et al. |
| 6,664,523 B1 | 12/2003 | Kim et al. |
| 6,696,678 B2 | 2/2004 | Hudson et al. |
| D495,556 S | 9/2004 | Milrud et al. |
| 6,853,399 B1 | 2/2005 | Gilman et al. |
| 6,975,525 B2 * | 12/2005 | Kernahan .......... H02M 1/0845 363/98 |
| D521,799 S | 5/2006 | Ledingham et al. |
| D522,801 S | 6/2006 | Lee |
| D527,572 S | 9/2006 | Lee et al. |
| 7,105,787 B2 | 9/2006 | Clemen, Jr. |
| 7,111,247 B2 | 9/2006 | Choi et al. |
| D530,973 S | 10/2006 | Lee et al. |
| D531,447 S | 11/2006 | Lee et al. |
| D532,645 S | 11/2006 | Lee |
| 7,193,195 B2 | 3/2007 | Lundstrom et al. |
| D540,105 S | 4/2007 | Lee et al. |
| D540,613 S | 4/2007 | Jeon |
| D550,024 S | 9/2007 | Jeon |
| 7,361,871 B2 | 4/2008 | Cho et al. |
| D568,675 S | 5/2008 | Kawata |
| 7,476,828 B2 | 1/2009 | Genua |
| 7,482,562 B2 | 1/2009 | Song et al. |
| D586,619 S | 2/2009 | Pino et al. |
| D587,959 S | 3/2009 | Hensel |
| 7,556,033 B2 | 7/2009 | Kim |
| D602,306 S | 10/2009 | Lavy |
| 7,770,985 B2 | 8/2010 | Davis et al. |
| D625,557 S | 10/2010 | Pino et al. |
| D626,370 S | 11/2010 | Baek |
| 7,919,735 B2 | 4/2011 | Kiyono et al. |
| 7,926,313 B2 | 4/2011 | Schenkl et al. |
| D638,249 S | 5/2011 | Ryan et al. |
| 8,074,637 B2 | 12/2011 | Yamauchi |
| D655,970 S | 3/2012 | De'Longhi |
| D658,439 S | 5/2012 | Curtis et al. |
| D662,759 S | 7/2012 | Blacken et al. |
| D663,156 S | 7/2012 | Curtis et al. |
| D670,529 S | 11/2012 | Hensel |
| D673,000 S | 12/2012 | De'Longhi |
| D673,418 S | 1/2013 | Lee et al. |
| D678,711 S | 3/2013 | Reiner |
| 8,389,916 B2 | 3/2013 | Ben-Shmuel et al. |
| 8,455,803 B2 | 6/2013 | Danzer et al. |
| 8,492,686 B2 | 7/2013 | Bilchinsky et al. |
| 8,530,807 B2 | 9/2013 | Niklasson et al. |
| 8,610,038 B2 | 12/2013 | Hyde et al. |
| 8,745,203 B2 | 6/2014 | McCoy |
| 8,803,051 B2 | 8/2014 | Lee et al. |
| D717,579 S | 11/2014 | Gregory et al. |
| 9,040,879 B2 | 5/2015 | Libman et al. |
| D736,554 S | 8/2015 | Steiner et al. |
| D737,620 S | 9/2015 | Miller et al. |
| D737,622 S | 9/2015 | Miller et al. |
| 9,131,543 B2 | 9/2015 | Ben-Shmuel et al. |
| 9,132,408 B2 | 9/2015 | Einziger et al. |
| 9,179,506 B2 | 11/2015 | Sim et al. |
| 9,210,740 B2 | 12/2015 | Libman et al. |
| 9,215,756 B2 | 12/2015 | Bilchinsky et al. |
| 9,351,347 B2 | 5/2016 | Torres et al. |
| 9,374,852 B2 | 6/2016 | Bilchinsky et al. |
| D769,669 S | 10/2016 | Kim et al. |
| 9,560,699 B2 | 1/2017 | Zhylkov et al. |
| 9,585,203 B2 | 2/2017 | Sadahira et al. |
| 2004/0074760 A1 | 4/2004 | Portnoff et al. |
| 2005/0162335 A1 | 7/2005 | Ishii |
| 2006/0289526 A1 | 12/2006 | Takizaki et al. |
| 2009/0134155 A1 | 5/2009 | Kim et al. |
| 2010/0176121 A1 | 7/2010 | Nobue et al. |
| 2010/0187224 A1 | 7/2010 | Hyde et al. |
| 2011/0031236 A1 | 2/2011 | Ben-Shmuel et al. |
| 2011/0168699 A1 | 7/2011 | Oomori et al. |
| 2011/0290790 A1 | 12/2011 | Sim et al. |
| 2012/0067872 A1 | 3/2012 | Libman et al. |
| 2012/0103972 A1 | 5/2012 | Okajima |
| 2012/0152939 A1 | 6/2012 | Nobue et al. |
| 2012/0160830 A1 | 6/2012 | Bronstering |
| 2013/0048881 A1 | 2/2013 | Einziger et al. |
| 2013/0080098 A1 | 3/2013 | Hadad et al. |
| 2013/0142923 A1 | 6/2013 | Torres et al. |
| 2013/0156906 A1 | 6/2013 | Raghavan et al. |
| 2013/0186887 A1 | 7/2013 | Hallgren et al. |
| 2013/0200066 A1 | 8/2013 | Gelbart et al. |
| 2013/0277353 A1 | 10/2013 | Joseph et al. |
| 2014/0197161 A1 | 7/2014 | Dobie |
| 2014/0203012 A1 | 7/2014 | Corona et al. |

(56) References Cited

U.S. PATENT DOCUMENTS

| | | |
|---|---|---|
| 2014/0208957 A1 | 7/2014 | Imai et al. |
| 2014/0277100 A1 | 9/2014 | Kang |
| 2015/0034632 A1 | 2/2015 | Brill et al. |
| 2015/0070029 A1 | 3/2015 | Libman et al. |
| 2015/0136758 A1 | 5/2015 | Yoshino et al. |
| 2015/0156827 A1 | 6/2015 | Ibragimov et al. |
| 2015/0173128 A1 | 6/2015 | Hosokawa et al. |
| 2015/0271877 A1 | 9/2015 | Johansson |
| 2015/0289324 A1 | 10/2015 | Rober et al. |
| 2015/0305095 A1 | 10/2015 | Huang et al. |
| 2015/0334788 A1 | 11/2015 | Hofmann et al. |
| 2015/0373789 A1 | 12/2015 | Meusburger et al. |
| 2016/0029442 A1 | 1/2016 | Houbloss et al. |
| 2016/0088690 A1 | 3/2016 | Kubo et al. |
| 2016/0119982 A1 | 4/2016 | Kang et al. |
| 2016/0219656 A1 | 7/2016 | Hunter, Jr. |
| 2016/0327281 A1 | 11/2016 | Bhogal et al. |
| 2016/0353528 A1 | 12/2016 | Bilchinsky et al. |
| 2016/0353529 A1 | 12/2016 | Omori et al. |
| 2017/0099988 A1 | 4/2017 | Matloubian et al. |
| 2017/0105572 A1 | 4/2017 | Matloubian et al. |

FOREIGN PATENT DOCUMENTS

| | | |
|---|---|---|
| CN | 101118425 | 2/2008 |
| CN | 201081287 Y | 7/2008 |
| CN | 102012051 A | 4/2011 |
| CN | 102620324 A | 8/2012 |
| CN | 103156532 A | 6/2013 |
| CN | 203025135 U | 6/2013 |
| CN | 105042654 A | 11/2015 |
| CN | 204987134 U | 1/2016 |
| CN | 106103555 A | 11/2016 |
| DE | 3238441 A1 | 4/1984 |
| DE | 102004002466 A1 | 8/2005 |
| DE | 102008042467 A1 | 4/2010 |
| EP | 0199264 A2 | 10/1986 |
| EP | 0493623 A1 | 8/1992 |
| EP | 1193584 | 3/2002 |
| EP | 1424874 A2 | 6/2004 |
| EP | 1426692 A2 | 6/2004 |
| EP | 1471773 A2 | 10/2004 |
| EP | 1732359 A2 | 12/2006 |
| EP | 1795814 | 6/2007 |
| EP | 1970631 A2 | 9/2008 |
| EP | 2031938 A1 | 3/2009 |
| EP | 2205043 A1 | 7/2010 |
| EP | 2230463 A1 | 9/2010 |
| EP | 2220913 B1 | 5/2011 |
| EP | 2512206 A1 | 10/2012 |
| EP | 2405711 A2 | 11/2012 |
| EP | 2618634 A1 | 7/2013 |
| EP | 2775794 A1 | 9/2014 |
| EP | 2906021 A1 | 8/2015 |
| EP | 2393339 B1 | 12/2016 |
| FR | 2766272 A1 | 1/1999 |
| FR | 2976651 A | 12/2012 |
| GB | 639470 A | 6/1950 |
| GB | 1424888 | 2/1976 |
| GB | 2158225 A | 11/1985 |
| GB | 2193619 A | 2/1988 |
| GB | 2367196 A | 3/2002 |
| JP | S55155120 A | 12/1980 |
| JP | 57194296 U | 12/1982 |
| JP | 59226497 A | 12/1984 |
| JP | H0510527 A | 1/1993 |
| JP | H06147492 A | 5/1994 |
| JP | 8-171986 | 7/1996 |
| JP | 2000304593 A | 11/2000 |
| JP | 2008060017 A | 3/2008 |
| JP | 2008108491 A | 5/2008 |
| JP | 2011146143 A | 7/2011 |
| JP | 2013073710 A | 4/2013 |
| KR | 2050002121 | 7/2005 |
| KR | 101359460 B1 | 2/2014 |
| KR | 20160093858 A | 8/2016 |
| RU | 2122338 C1 | 11/1998 |
| RU | 2215380 C2 | 10/2003 |
| RU | 2003111214 A | 11/2004 |
| RU | 2003122979 A | 2/2005 |
| RU | 2008115817 A | 10/2009 |
| RU | 2008137844 A | 3/2010 |
| WO | 8807805 A1 | 10/1988 |
| WO | 0036880 | 6/2000 |
| WO | 02065036 A1 | 8/2002 |
| WO | 03077601 A1 | 9/2003 |
| WO | 2008018466 A1 | 2/2008 |
| WO | 2008102360 A2 | 8/2008 |
| WO | 2009039521 A1 | 3/2009 |
| WO | 2011138680 A2 | 11/2011 |
| WO | 2012001523 A2 | 1/2012 |
| WO | 2012162072 | 11/2012 |
| WO | 2011039961 A1 | 2/2013 |
| WO | 2015024177 A1 | 2/2015 |
| WO | 2015099648 A1 | 7/2015 |
| WO | 2015099650 A1 | 7/2015 |
| WO | 2015099651 A1 | 7/2015 |
| WO | 2016128088 A1 | 8/2016 |
| WO | 2017190792 A1 | 11/2017 |

\* cited by examiner

METHOD AND APPARATUS FOR DELIVERING RADIO FREQUENCY ELECTROMAGNETIC ENERGY TO COOK FOODSTUFF

BACKGROUND OF THE INVENTION

Current microwave cooking appliances use powerful tubes to generate microwaves with nominal operating frequencies to heat food. A disadvantage of using such powerful sources is a limited ability to control emission of the microwaves. Solid state sources enable specifying emissions that allow for a more controlled cooking appliance. Some solid state sourced microwave cooking appliance designs include determining a model of the cavity of the microwave, but do not allow for specified cooking strategies regarding the food within the cavity. There is a need to improve control of the emissions using solid state sources to achieve better heating for specific food items and more efficient appliances.

SUMMARY OF THE INVENTION

In one aspect, a method of delivering radio frequency electromagnetic energy to an enclosed cavity of a heating device includes generating, with a small signal generating component, a radio frequency signal at a first power level that is pulse width modulated at a predetermined duty cycle, amplifying the radio frequency signal to a second power level greater than the first power level with a radio frequency amplification component, and feeding the amplified radio frequency signal to the enclosed cavity. The first power level is based on the gain of the radio frequency amplification component and the predetermined duty cycle is based on a ratio of an output power level for a desired heating cycle of operation to the second power level.

In another aspect, an apparatus for delivering radio frequency electromagnetic energy to an enclosed cavity of a heating device includes a cavity configured to hold an article to be heated, a small signal generator to generate a radio frequency signal at a first power level that is pulse width modulated at a predetermined duty cycle, a power amplifier connected to the small single generator to amplify the radio frequency signal generated by the small signal generator to a second power level greater than the first power level, a transmission line between the power amplifier and the enclosed cavity to feed the amplified radio frequency signal from the power amplifier to the enclosed cavity, and a controller configured to set the first power level based on the gain of the power amplifier and to set the predetermined duty cycle based on a ratio of an output power level for a desired heating cycle of operation to the second power level.

DETAILED DESCRIPTION

Figure 1:
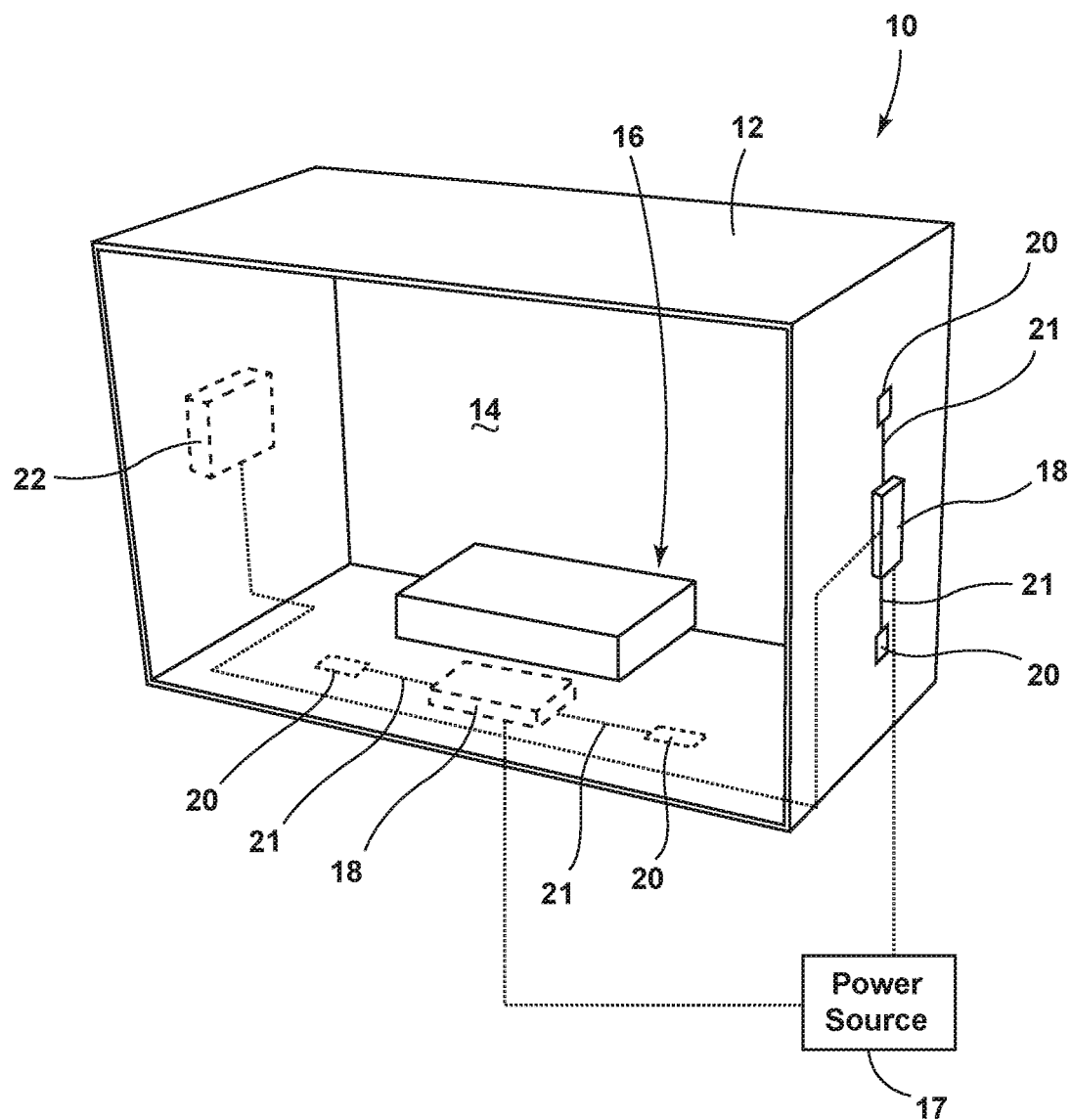
FIG. 1 is a schematic view of a cooking device in the embodiment of a microwave heating apparatus, in accordance with various aspects described herein.

FIG. 1 illustrates a cooking device, shown as a microwave appliance or microwave oven 10, having a housing 12 defining a cavity 14 into which at least one food item, article, or "foodstuff" 16 (schematically shown as a box) to be heated or cooked can be placed or held. The microwave oven 10 FIG. 1 is illustrated having an open cavity 14 for ease of depiction of the foodstuff 16, and embodiments of the disclosure can include microwaves 10 having an enclosed cavity 14, such as by way of a pivotable, movable, or removable panel, such as a door.

The microwave oven 10 includes a power source 17 with an input range preferably ranging from less than 1 W to 250 W and at least one microwave generator 18, which is capable of generating a radio frequency electromagnetic energy field (hereafter, "energy field"), with an operating frequency preferably ranging from 2.401 GHz to 2.48 GHz. In an exemplary embodiment, the microwave oven 10 can have two or more microwave generators 18, wherein each microwave generator 18 is electrically coupled with the power source 17. Each microwave generator 18 can include at least one antenna (not shown) adapted to provide the energy field generated by the microwave generator 18, which is fed into the cavity 14 by way of at least one feeding port 20 electrically coupled with each microwave generator 18 by way of at least one conductor or transmission line 21.

The microwave oven 10 can also include a control system 22, communicatively coupled with the microwave generators 18, the power source 17, or a combination thereof, and programmed or configured to control the generation of the energy field by the microwave generator 18. For example, the control system 22 can operably control the power output of the power source 17, the operation of the at least one microwave generator 18, or electromagnetic characteristics of the generated energy field, such as power level or frequency. In embodiments of the disclosure wherein at least two microwave generators 18 are utilized, the control system 22 can further operably control the phase of the at least two microwave generators 18 to alter the interference pattern of the electromagnetic waves of the energy field.

During cooking or heating operations, the control system 22 of the microwave oven 10 operates to control the generation of the energy field by the microwave generators 18 and to provide the energy field into the cavity 14 by way of the feeding ports 20. The energy field interacts with the foodstuff 16 to heat or cook the foodstuff 16. The illustrated embodiment of FIG. 1 is one non-limiting example of an embodiment of the disclosure. Additional non-limiting embodiments of the disclosure can include additional or alternatively located components, including but not limited to, the microwave generators 18, feeding ports 20, control system 22, power source 17, or the like.

Figure 2:
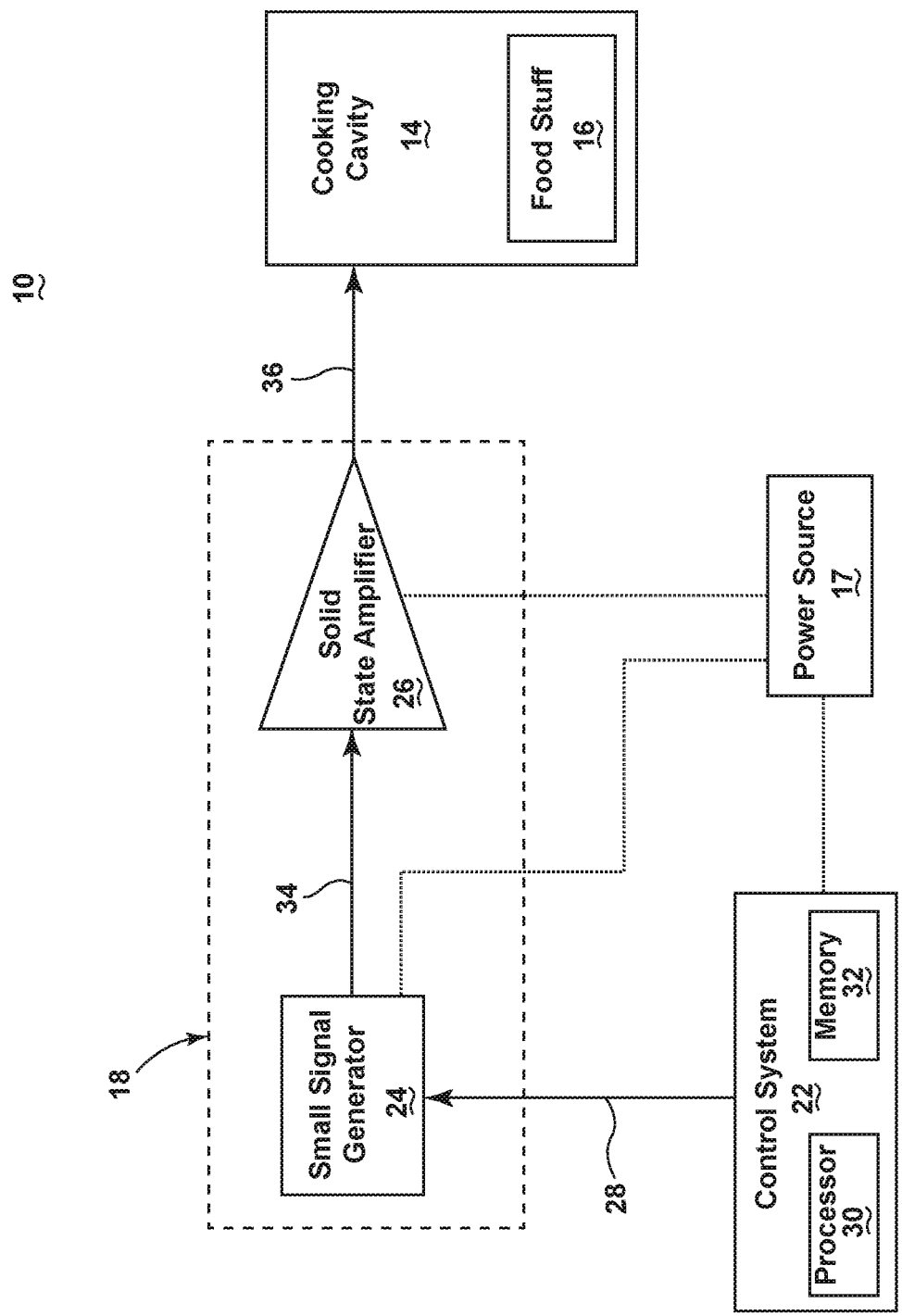
FIG. 2 is a schematic view of the microwave heating apparatus of FIG. 1, in accordance with various aspects described herein.

FIG. 2 illustrates a schematic view of the microwave oven 10. While only one microwave generator 18 is illustrated for brevity, embodiments of the disclosure can include a plurality of microwave generators 18 operating in independently, as a common group with common respective outputs, or in a cohesive fashion wherein the plurality of microwave generators 18 operate to collectively provide the energy field utilized to heat or cook the foodstuff 16 in the cavity 14. As shown, the microwave generator 18 can include a small signal generator 24 configured to generate the radio frequency signal at a first power level, and a radio frequency power amplifying component, such as a solid state radio frequency signal amplifier 26. The control system 22 can also include a processor 30 and memory 32. The control system 22 or the processor 30 can be configured to provide or supply a control signal 28, that is, an analog or digital communication signal, to the microwave generator 18 or the small signal generator 24.

The memory 32 can include random access memory (RAM), read-only memory (ROM), flash memory, or one or more different types of portable electronic memory, such as discs, DVDs, CD-ROMs, etc., or any suitable combination of these types of memory. The control system 22 can be operably coupled with the memory 32 such that one of the control system 22 and the memory 32 can include all or a portion of a computer program having an executable instruction set for controlling the operation of the aforementioned components, or a method of operating the same. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Machine-executable instructions, associated data structures, and programs represent examples of program code for executing the exchange of information as disclosed herein. Machine-executable instructions can include, for example, instructions and data, which cause a general purpose computer, special purpose computer, control system 22, or special purpose processing machine to perform a certain function or group of functions. In implementation, the functions can be converted to a computer program comprising a set of executable instructions, which can be executed by the processor 30.

The control signal 28 can include a desired cooking signal representative of a heating or cooking energy field desired for heating or cooking the foodstuff 16. Embodiments of the control signal 28 can further include a desired cooking signal generated or selected, for example from a database, executable instruction set executed by the processor 30, look up table stored in memory 32, or the like, based at least partially on the foodstuff 16 to be heated or cooked. For example, a user can select from a variety of foodstuff 16 settings or values on a user interface for heating or cooking cycles of operation tailored to a particular foodstuff 16. In this sense, embodiments of the disclosure can include configurations wherein the control system 22 includes a user interface. Examples of tailored cooking cycles of operation can include, but is not limited to, a "defrost" selection, "popcorn" selection, "reheat" selection, "vegetables" selection, or the like.

The control signal 28 can also include a desired cooking signal representative of heating or cooking energy field characteristics desired for heating or cooking of the foodstuff 16. For example, the heating or cooking energy field characteristics of the control signal 28 can include, but is not limited to, a first power level desired, a second power level desired, a signal switching frequency, and the like. At least a subset of the aforementioned representative signals included in or carried by the control signal 28 can be configured, selected, or determined based on the foodstuff 16 to be heating or cooked, such as from a user interface as explained above. In another non-limiting example, at least a subset of the aforementioned representative signals can be configured, selected, or determined based on the electrical efficiency or gain of the microwave generator 18, the small signal generator 24, the solid state amplifier 26, or a combination thereof. For instance, the subset of representative signals can be configured, selected, or determined based on operating the microwave 10 at a maximum electrical efficiency, an electrical efficiency above an efficiency threshold value, an electrical efficiency with an efficiency threshold range, at maximum output power, at maximum amplification stage gain, or a combination thereof.

Embodiments of the disclosure can include configurations wherein at least a subset of the aforementioned representative signals included in or carried by the control signal 28, including the aforementioned embodiments, can further be configured, selected, or determined by executable software operated by the microwave oven 10, control system 22, or processor 30, or from a look up table stored in memory 32 and accessible by the control system 22 or processor 30. For example, the maximum electrical efficiency, maximum gain, efficiency threshold value, efficiency threshold range, or a combination thereof can include respective predetermined values stored in memory 32, or can be derived based on executable software to determine, develop, compute such values. In yet another embodiment of the disclosure, at least a subset of the aforementioned representative signals included in or carried by the control signal 28 can be configured, selected, or determined based on feedback or sensed characteristics of the foodstuff 16. Such feedback or sensed characteristics can be observer, sensed, or measured by way of a plurality of sensors, including, but not limited to, an optical sensor such as a camera, a steam or temperature sensor, or the like.

The small signal generator 24 receives the control signal 28, and in response to the control signal 28 and included representative signals, generates a first radio frequency signal 34 at the first low power level. As used herein, a "low" power level denotes a signal, power, or energy level below the energy field level utilized to heat or cook the foodstuff 16. In one embodiment of the disclosure, the small signal generator 24 can generate a first radio frequency signal 34 in response to the control signal 28, wherein the first radio frequency signal 34 is, for example, pulse width modulated at a predetermined switching frequency. In this example, the predetermined switching frequency is defined, controlled, selected, or instructed by the signal switching frequency energy field characteristic of the control signal 28. Non-limiting embodiments of the disclosure can include wherein the predetermined switching frequency is at least 20 KHz. It will be understood that the predetermined switching frequency can define or affect the energy field generated by the microwave generator 18. For example, the predetermined switching frequency can include controlling, altering, or defining a duty cycle for the microwave generator 18, the small signal generator 24, or the solid state amplifier 26.

In another non-limiting embodiment of the disclosure the predetermined switching frequency can be related to electrical regulations or practical power source 17 concerns regarding the predetermined switching on and off of the power, including flickering, modulation, power surges or deficiencies, and the like. It is understood that pulse width modulation signals can be configured to operably control, select, or limit an amount of energy field supplied to the cavity 14. Another non-limiting embodiment, the first radio frequency signal 34 can include a first low power level of less than 1 Watt, such as 300 milliwatt.

In yet another embodiment of the disclosure, the first radio frequency signal 34 can be selected or generated based on the expected, predetermined, estimated, or derived electrical efficiency or gain of at least one of the microwave generator 18, the small signal generator 24, or the solid state amplifier 26. For instance, the first radio frequency signal 34 can include a predetermined switching frequency based at least on a ratio of an expected or estimated output power level of the energy field generated by the microwave generator 18, for a desired heating or cooking cycle of operation.

The first radio frequency signal 34 can be provided to the solid state amplifier 26. Solid state amplifiers 26 include the operably ability to be tunable and coherent, that is precisely controllable to amplify a specific signal, compared with a magnetron source that is not narrow band and not tunable (i.e. emits microwave signals at a changing frequency over time that is not precisely selectable). The solid state amplifier 26 can operably amplify the first radio frequency signal 34 having the first low power level to a second radio frequency signal 36 having a second high power level embodying the heating or cooking energy field utilized to heat or cook the foodstuff 16. During amplification by the solid state amplifier 26, the power level can be increased from the first low power level to the second high power level, and the predetermined switching frequency can be unchanged, or can remain constant through the power amplification process. One non-limiting embodiment of the second radio frequency signal 34 can include a second high power level of greater than 50 or 100 Watts, such as 250 Watts. The second high power level can also be described in terms of a gain, such as a 32 dB gain. While a single solid state amplifier 26 is illustrated for brevity, embodiments of the disclosure can include a plurality of solid state amplifiers 26, each amplifying a first radio frequency signal 34. The final output power of the energy field, for example from a plurality of microwave generators 18 can include 1000 Watts or more.

The second radio frequency signal 36 can then be provided to the cavity 14, for example, by way of the feeding ports 20, wherein the energy field can interact with the foodstuff 16 to heat or cook the foodstuff 16, as desired. As illustrated, the power source 17 can be electrically coupled with the control system 22, the small signal generator 24, the solid state amplifier 26, or a combination thereof, to operably supply power to the respective components. The power supplied by the power source 17 can be utilized by the respective components to, for example, generate the control signal 28 in the control system 22, generate the first radio frequency signal 34 in the small signal generator 24, amplify the first radio frequency signal 34 to the second radio frequency signal 36 in the solid state amplifier 26, or a combination thereof.

When foodstuff 16 is heated or cooked by operably utilizing such a high predetermined switching frequency, the food acts similar to a lowpass filter such that the measureable heating effect increases the cooking efficiency of the microwave. Additionally, the heating or cooking employed by the above-described embodiments can result in a more uniform or even temperature rise of the foodstuff 16, compared with conventional microwaves.

While the aforementioned description explains that the first radio frequency signal 34 having the first low power level can be amplified to the second radio frequency signal 36 having a second high power level, embodiments of the disclosure can be included wherein the control signal 28 includes representative signals indicative of the estimated or expected second radio frequency signal 36 or the estimated or expected second high power level, and wherein the first radio frequency signal 34 or the first low power level is determined or selected based on the second radio frequency signal 36 or second high power level. For example, the first radio frequency signal 34 or the first low power level can be determined, selected, or generated by the small signal generator 24 (e.g. by the control system 22 or processor 30, as explained herein, and received by way of the control signal 28) such that the first radio frequency signal 34 is amplified to the second radio frequency signal 36, wherein the microwave generator 18 operates at the maximum electrical efficiency or gain, above or higher than the electrical efficiency threshold value, within the bounds of an efficiency threshold range, maximum output power, maximum gain, or a combination thereof.

The above-described embodiment is effective in increasing or maximizing the electrical efficiency of the microwave generator 18 when the estimated or expected second radio frequency signal 36 or second high power level is known, and the amplification or gain of the solid state amplifier 26 is known to occur at a high or maximum electrical efficiency or gain. For instance, the solid state amplifier 26 can be selected such that the desired, known, or predetermined operable amplification for the microwave 10 or microwave generator 18 occurs in the compression zone of the solid state device, for improved electrical performance and efficiency.

As used herein, the "compression zone" or "gain compression" of the solid state amplifier 26 is related to the nonlinearity of the transfer function of a solid state amplifying device. Outside the range of the compression zone, the nonlinearity of the gain becomes apparent, and the efficiency of the gain is reduced due to, for example, thermal limits or thermal efficiencies of the solid state device. Stated another way, when a solid state amplifier 26 amplifier an input signal to a gained output signal outside of the compression zone, an increase in input will not be matched by a proportional increase in output, reducing the effective efficiency of the solid state amplifier 26. The compression zone can be determined, predetermined, or defined based on the selected solid state amplifier 26, and can include a "deep gain compression zone" relative to a "compression point," that is, a zone of substantially liner amplification relative to a maximum electrical efficiency or gain point of amplification, or a zone or range about the compression point, such as plus or minus 3 dB about the compression point.

In this sense, embodiments of the disclosure can increase or maximize the electrical efficiency or gain of the microwave generator 18 by the control system 22 or processor 30 determining a desired second radio frequency signal 36 for heating or cooking the foodstuff 16, and configure, select, or determine at least a subset of the aforementioned representative signals included in or carried by the control signal 28 such that the amplification of the first radio frequency signal 34 generated by the small signal generator 24 occurs with maximum electrical efficiency or gain (e.g. based on a efficiency value or efficiency range, including amplification operation within the compression zone, deep gain compression zone, or substantially at or near the compression point, as explained above) based on operating the solid state amplifier 26 in a predetermined compression zone.

In embodiments wherein the efficiency is based on a maximum electrical efficiency or gain, the first radio frequency signal 34 can be selected such that the solid state amplifier 26 amplifies the first radio frequency signal 34 to the second radio frequency signal 36 with actual or estimated maximum electrical efficiency. In embodiments wherein the efficiency is based on an electrical efficiency above an efficiency threshold value, the first radio frequency signal 34 can be selected such that the solid state amplifier 26 amplifies the first radio frequency signal 34 to the second radio frequency signal 36 with actual or estimated electrical efficiency greater than the efficiency threshold value. In embodiments wherein the efficiency is based on an electrical efficiency threshold range, the first radio frequency signal 34 can be selected such that the solid state amplifier 26 amplifies the first radio frequency signal 34 to the second radio frequency signal 36 with actual or estimated electrical efficiency within the bounds of the electrical efficiency threshold range.

Alternatively, or in addition to the above-described embodiment, embodiments of the disclosure can include configurations wherein the amplification of the first radio frequency signal 34 by the solid state amplifier 26 operates such that the first radio frequency signal 34 is amplified to the second radio frequency signal 36 such that the second radio frequency signal 36 includes the maximum output power or maximum gain operable for the solid state amplifier 26. This embodiment can include operating the solid state amplifier 26 in a maximum output power region or a maximum gain region of the amplifier 26, compared with a maximum electrical efficiency, described herein.

The determination of electrical efficiency or gain can further account for the actual or expected duty cycle or predetermined switching frequency of the first or second radio frequency signal 34, 36 during operation. In yet another example embodiment of the disclosure the control system 22 or processor 30 can select or define an expected duty cycle or predetermined switching frequency for the first or second radio frequency signal 34, 36 to maximize the electrical efficiency or gain of the microwave generator 18, as explained herein.

Figure 3:
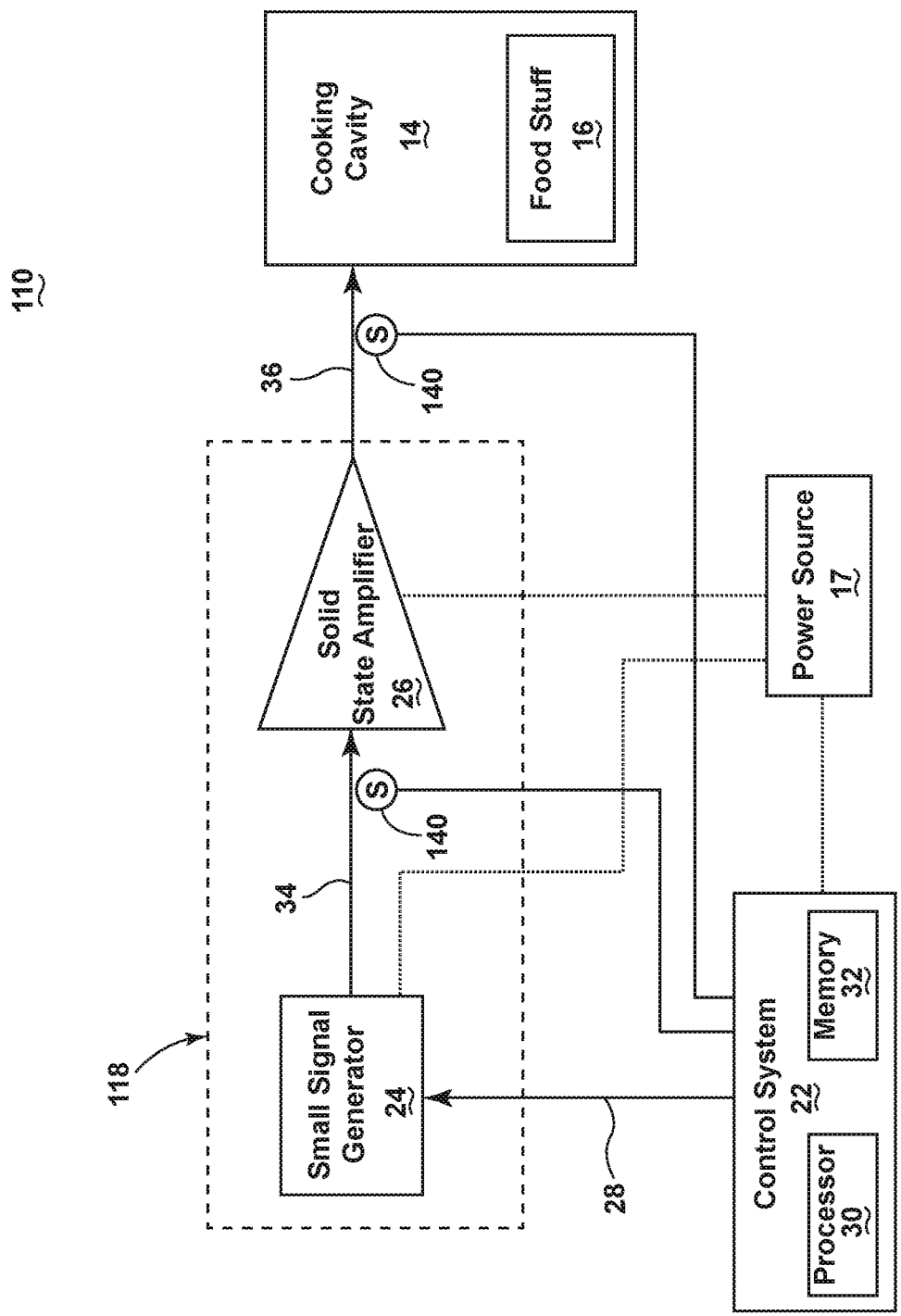
FIG. 3 is a schematic view of a microwave heating apparatus according to a second embodiment of the disclosure, in accordance with various aspects described herein.

FIG. 3 illustrates an alternative microwave 110 and microwave generator 118 according to a second embodiment of the disclosure. Where the second embodiment is similar to the first embodiment, like parts will be identified with like numerals increased by 100, with it being understood that the description of the like parts of the first embodiment applies to the second embodiment, unless otherwise noted. A difference between the first embodiment and the second embodiment is that the microwave 110 of the second embodiment can include at least one power sensor 140 positioned or configured to measure, sense, or sample at least one of the power of the first radio frequency signal 34 or the second radio frequency signal 36, and provide the measurement to the control system 22 or processor 30. Embodiments of the power sensor 140 can include any sensor configured to sense power or a characteristic related to power, including but not limited to, a current sensor or a voltage sensor. As shown, optional configurations of the second embodiment of the disclosure can include respective power sensors 140 on each of the first and second radio frequency signals 34, 36.

Sensing or measuring the power of at least the first or second radio frequency signal 34, 36 can include determining a value indicative of or related to the power level of the respective signal, rather than directly sensing or measuring the power itself. The sensed or measured values can be provided to additional components. For instance, the value can be provided to a control system 22 or processor 30, and the control system 22 or processor 30 can perform processing on the value to determine a power level of the respective signal or a characteristic representative of said power level.

The second embodiment of the disclosure can utilize the at least one power sensor 140 provide feedback to the control system 22 or processor 30 of the actual power levels of at least the first or second radio frequency signals 34, 36.

The feedback can enable the control system 22 or the processor 30 to, for example, estimate, calculate, or determined the compression zone of the solid state amplifier 26, or any other power level useful in estimating or determining the electrical efficiency or gain of the microwave 110 or the microwave generator 118. In this sense, the control system 22 or processor 30 can determine the maximum electrical efficiency or gain (as described above) based on the sensed power from the at least one power sensor 140.

Figure 4:
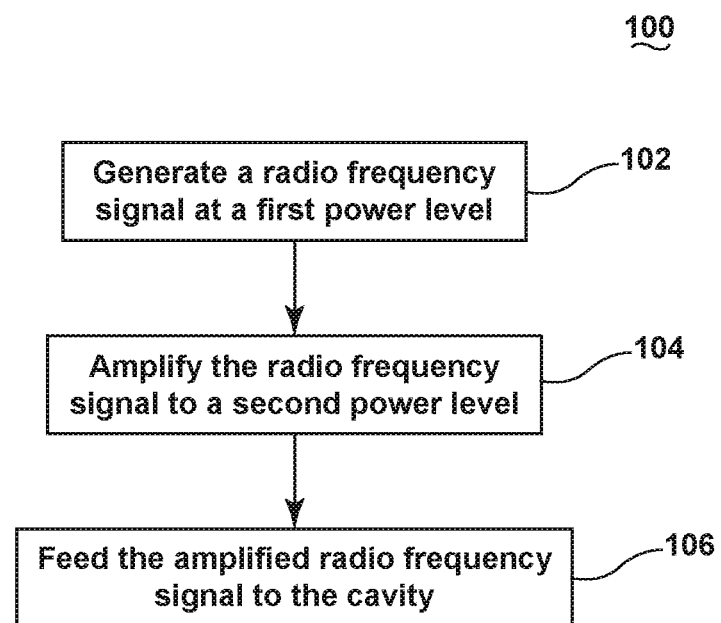
FIG. 4 is an example a flow chart diagram of delivering radio frequency electromagnetic energy to cook foodstuff, in accordance with various aspects described herein.

FIG. 4 illustrates a flow chart demonstrating a method 100 of delivering radio frequency electromagnetic energy to cook foodstuff in an enclosed cavity of a cooking device, such as a microwave. The method 100 begins by generating, with the small signal generator 24, a radio frequency signal at a first power level that is pulse width modulated at a predetermined switching frequency at 102. Next, the method 100 amplifies the radio frequency signal to a second power level, greater than the first power level, with the solid state amplifier 26 at 104. Finally, the method 100 feeds the amplified radio frequency signal to the enclosed cavity 14 at 106, wherein the amplified radio frequency signal operably heats or cooks the foodstuff 16 within the cavity 14. The sequence depicted is for illustrative purposes only and is not meant to limit the method 100 in any way as it is understood that the portions of the method can proceed in a different logical order, additional or intervening portions can be included, or described portions of the method can be divided into multiple portions, or described portions of the method can be omitted without detracting from the described method.

Many other possible embodiments and configurations in addition to that shown in the above figures are contemplated by the present disclosure.

The technical effect of the above described embodiments enable a method and apparatus for delivering radio frequency electromagnetic energy to cook foodstuff in a cooking device, such as a microwave. One advantage that can be realized in the above embodiments is that the above described embodiments have superior electrical operating efficiency compared to conventional microwave systems. Additionally, by operating the energy field at the predetermined switching frequency, the measurable heating effects on the foodstuff are consistent over the high efficiency cooking period. Compare this with the heating effects while cooking foodstuff with a conventional microwave, wherein the significantly longer or slower switching periods (on the order of seconds) produce measureable heating effects followed by a sudden temperature decrease as the energy field is shut down, producing undesirable cooking temperature oscillations. The aforementioned oscillations in cooking temperature reduce the effective cooking efficiency or performance of the microwave.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" or "a plurality of" various elements have been described, it will be understood that "a set" or "a plurality" can include any number of the respective elements, including only one element. Combinations or permutations of features described herein are covered by this disclosure.

This written description uses examples to disclose embodiments of the disclosure, including the best mode, and also to enable any person skilled in the art to practice embodiments of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of delivering radio frequency electromagnetic energy to an enclosed cavity of a heating device, the method comprising:
   generating, with a small signal generating component, a radio frequency signal at a first power level that is pulse width modulated at a predetermined duty cycle;
   amplifying the radio frequency signal to a second power level greater than the first power level with a radio frequency amplification component; and
   feeding the amplified radio frequency signal to the enclosed cavity;
   wherein the first power level is based on the gain of the radio frequency amplification component and the predetermined duty cycle is based on a ratio of an output power level for a desired heating cycle of operation to the second power level.

2. The method of claim 1 further comprising determining a maximum efficient range for the radio frequency amplification component.

3. The method of claim 2 wherein the maximum efficient range is determined by one of sampling and measuring power output from the radio frequency amplification component and retrieving data from a lookup table.

4. The method of claim 2 wherein the first power level is selected to be amplified within the maximum efficient range.

5. The method of claim 4 wherein the first power level is selected to be amplified in a deep gain compression zone relative to a compression of the radio frequency amplification component.

6. The method of claim 4 wherein the first power level is selected to be amplified in a deep gain compression zone relative to at least one of a maximum efficiency or a maximum output power of the radio frequency amplification component.

7. The method of claim 1 further comprising determining a maximum power needed to heat an article in the heating device, and setting the predetermined duty cycle based on the maximum power needed.

8. An apparatus for delivering radio frequency electromagnetic energy to a heating device comprising:
   an enclosed cavity configured to hold an article to be heated;
   a small signal generator to generate a radio frequency signal at a first power level that is pulse width modulated at a predetermined duty cycle;
   a power amplifier connected to the small single generator to amplify the radio frequency signal generated by the small signal generator to a second power level greater than the first power level;
   a transmission line between the power amplifier and the enclosed cavity to feed the amplified radio frequency signal from the power amplifier to the enclosed cavity; and
   a controller configured to set the first power level based on the gain of the power amplifier and to set the predetermined duty cycle based on a ratio of an output power level for a desired heating cycle of operation to the second power level.

9. The apparatus of claim 8 wherein the power amplifier has a maximum efficient range and the controller is configured to set the first power level to be amplified within the maximum efficient range.

10. The apparatus of claim 8 further comprising at least one sensor to measure power output from the power amplifier and send a signal representative of the power output to the controller wherein the controller is configured to determine the maximum efficient range based on the power output.

11. The apparatus of claim 8 further comprising memory coupled with the controller and having a look up table with maximum efficient range for the power amplifier.

12. The apparatus of claim 8 wherein the controller is further configured to determine a deep gain compression zone relative to a compression point of the power amplifier and to set the first power level to be amplified in the deep gain compression zone.

13. The apparatus of claim 8 wherein the controller is further configured to determine a deep gain compression zone relative to a compression point relative to at least one of a maximum efficiency or a maximum output power of a radio frequency amplification component, and to set the first power level, a maximum output power of the power amplifier, or a maximum gain of the power amplifier.

14. The apparatus of claim 8 wherein the controller is further configured to determine a maximum power needed to heat an article in the heating device, and set the predetermined duty cycle based on the maximum power needed.

* * * * *